(12) United States Patent
Brendel et al.

(10) Patent No.: US 6,391,180 B1
(45) Date of Patent: May 21, 2002

(54) DEVICE FOR SURFACE TREATMENT BY IMMERSION

(75) Inventors: Gerhard Brendel, Auerbach; Rudolf Fuchs, Nürnberg; Ernst-Walter Hillebrand, Wickede, all of (DE)

(73) Assignees: Nutro Maschinen-und Anlagenbau GmbH & CO KG, Nuremberg; Walter Hillebrand GmbH & CO, KG, Wickede, both of (DE)

( * ) Notice: Subject to any disclaimer, the term of this patent is extended or adjusted under 35 U.S.C. 154(b) by 0 days.

(21) Appl. No.: 09/381,936

(22) PCT Filed: Mar. 28, 1998

(86) PCT No.: PCT/EP98/01832

§ 371 Date: Nov. 29, 1999

§ 102(e) Date: Nov. 29, 1999

(87) PCT Pub. No.: WO98/44170

PCT Pub. Date: Oct. 8, 1998

(30) Foreign Application Priority Data

Mar. 28, 1997 (DE) .......................................... 197 13 203

(51) Int. Cl.$^7$ ............................. C25D 5/00; C25D 7/00; B05C 3/02; B05C 3/00; B05C 1/18
(52) U.S. Cl. ........................ 205/137; 205/145; 204/198; 204/512; 118/407; 118/423; 427/430.1
(58) Field of Search ................................. 118/407, 423; 204/198, 512; 427/430.1; 205/145, 137

(56) References Cited

U.S. PATENT DOCUMENTS

| 4,331,230 A | * | 5/1982 | Buckley | ..................... 198/484 |
| 4,775,454 A | * | 10/1988 | Urquhart et al. | ............ 204/201 |
| 6,071,385 A | * | 6/2000 | Long | .......................... 204/222 |

FOREIGN PATENT DOCUMENTS

| DE | 4428789 | 5/1995 |
| EP | 0654548 | 5/1995 |
| GB | 2089838 | 6/1982 |

* cited by examiner

*Primary Examiner*—Edna Wong
(74) *Attorney, Agent, or Firm*—Merchant & Gould P.C.

(57) ABSTRACT

In a device for surface treatment, in particular for electrochemical coating followed by electrophoretic coating, the material to be treated is moved through coating vessels in one or more planes. This is carried out using stepped cage conveyors which are provided, at different heights, with bearing arms for trays on which the material to be treated is located. Horizontal electrodes, past which the trays are moved, project between the bearing arms of each plane or into the space between each tray.

15 Claims, 10 Drawing Sheets

DEVICE FOR SURFACE TREATMENT BY IMMERSION

TECHNICAL FIELD

The invention relates to a device and a method for surface treatment, in which the material which is to treated is guided through a bath, where it is treated chemically, by electro-plating and/or electro-phoretically.

BACKGROUND

Methods and devices of this type are used to provide items which are composed at least partially of a conductive material with a surface whose technical or visual properties are adapted to the particular application. This may be carried out by chemical or electrochemical treatment of the surface, for example by chromating the surface of a metallic work piece, and by electrolytic or electrophoretic application of a coating layer.

The known wet methods are extremely complex, since the material which is to be treated has to be guided through a series of vessels which are arranged in series and contain a very wide variety of treatment liquids, for example cleaning agents, electrolytes and electrophoretic enamels. This is carried out discontinuously by immersion of individual items or batches of small parts or in continuous installations using conveyors which move the material which is to be treated individually or, if small parts are involved, in a successive series from immersion basin to immersion basin, through a treatment line. By way of example, a conveyor which holds the material which is to be treated is suitable for this purpose. An appropriate device is known from German Patent 41 42 997.

Since the chemical surface treatment is a time-dependent operation both in the case of electrolytic coating and in the case of electrophoretic coating, a specific residence time of the material which is to be treated is required in the individual immersion basins depending on the particular treatment agent. This residence time, which differs considerably in individual cases, at a given conveying or passage rate, determines the treatment distance required, and consequently the dimensions of the individual immersion basins in the direction of transport.

Since individual large pieces of material which is to be treated and small parts, in order to obtain a homogeneous surface, can only be guided through the individual baths with a limited bed height, conventional installations are extraordinarily expensive and have a comparatively low throughput.

A particular problem consists in achieving a surface treatment which is uniform on all the parts, for example electroplating and/or enameling over the entire surface without flaws. Flaws of this nature are formed in particular at the points of contact between the material to be treated and the conveyor means for transporting the material to be treated through the individual baths. Suitable conveyor means are, in particular for small parts or bulk material, drums although in some cases conveyor belts and, for relatively large parts, special transport cages which are designed according to the configuration of the material to be treated and are therefore expensive, are also suitable. Medium-sized and large parts can also be moved through the individual immersion vessels with the aid of a conveyor belt; in this case, however, the parts have to be arranged one behind the other on the conveyor, in order to make their surfaces as accessible as possible to the treatment agent. However, an arrangement of this nature in a single plane entails the drawback that the throughput is reduced considerably compared to cage transport with parts which are arranged one above the other within certain limits.

SUMMARY OF THE INVENTION

The invention is therefore based on the problem of improving the economic viability of the known methods and devices without detriment to the surface quality of the material which is to be treated.

The solution to this object is based on the idea of multiplying the throughput at a given conveying rate, in the individual immersion basins by guiding the material which is to be treated through the individual immersion basins in a plurality of planes one above the other. This can be achieved with the aid of a movable stepped cage, between the steps of which treatment elements, for example stationary electrodes or nozzles for treatment liquid or drying air, which are arranged in the same pattern in a plurality of planes, are arranged.

In this way, the material which is to be treated is guided past the stationary treatment elements with its surface made as accessible as possible, and the throughput is increased as a function of the number of conveying planes or steps.

Moreover, the method according to the invention opens up the possibility of acting on the material to be treated from above and below, for example by spraying or blowing on drying air. Furthermore, an improved layer thickness distribution is achieved, since the electrodes are arranged in a linear manner with respect to the material which is to be treated.

In order to achieve a surface which is as uniform as possible, without flaws, the material which is to be treated can be rearranged within the bath or between two baths, in order to expose points of contact and make them accessible to the treatment agent. The rearrangement may be effected by vibration, with the aid of magnets or with the aid of a rake, the fingers of which engage, in the manner of a comb, between rods or lamellae of a support for the material which is to be treated, for example of a tray.

A device in which the material to be treated is arranged in a lying or suspended position in several planes on or at the stepped cage of a conveyor which guides the material to be treated at least through one vessel, for example an immersion vessel, is particularly suitable for carrying out the method according to the invention. The material which is to be treated is preferably located on a tray and can be deposited in the stepped cage by a supply conveyor, preferably a double-strand conveyor. In order to be able to feed the individual steps or levels of the cage, the stepped cage preferably comprises a vertically displaceable carriage with bearing arms which are arranged at a distance from one another. In this way, the bearing arms can be moved successively into the conveyor plane, in order to lift off and thus pick up a lamellate tray from the conveyor.

For its part, the lifting carriage may be guided in a horizontally displaceable cage trolley which moves the cage through the particular coating vessel.

The fact that the material to be treated, during loading of the stepped cage, moves successively, i.e. at intervals, into the immersion bath does not cause any disadvantage, and in particular does not result in any difference in residence time, if during this phase no current is being applied to the material to be treated.

In this way, the material to be treated can be moved gently into the immersion bath, since it is moving vertically downward and, due to its weight, is held securely on its support.

BRIEF DESCRIPTION OF THE FIGURES

The invention is explained in more detail below with reference to an exemplary embodiment which is illustrated in the drawing, in which.

DETAILED DESCRIPTION

Figure 1:
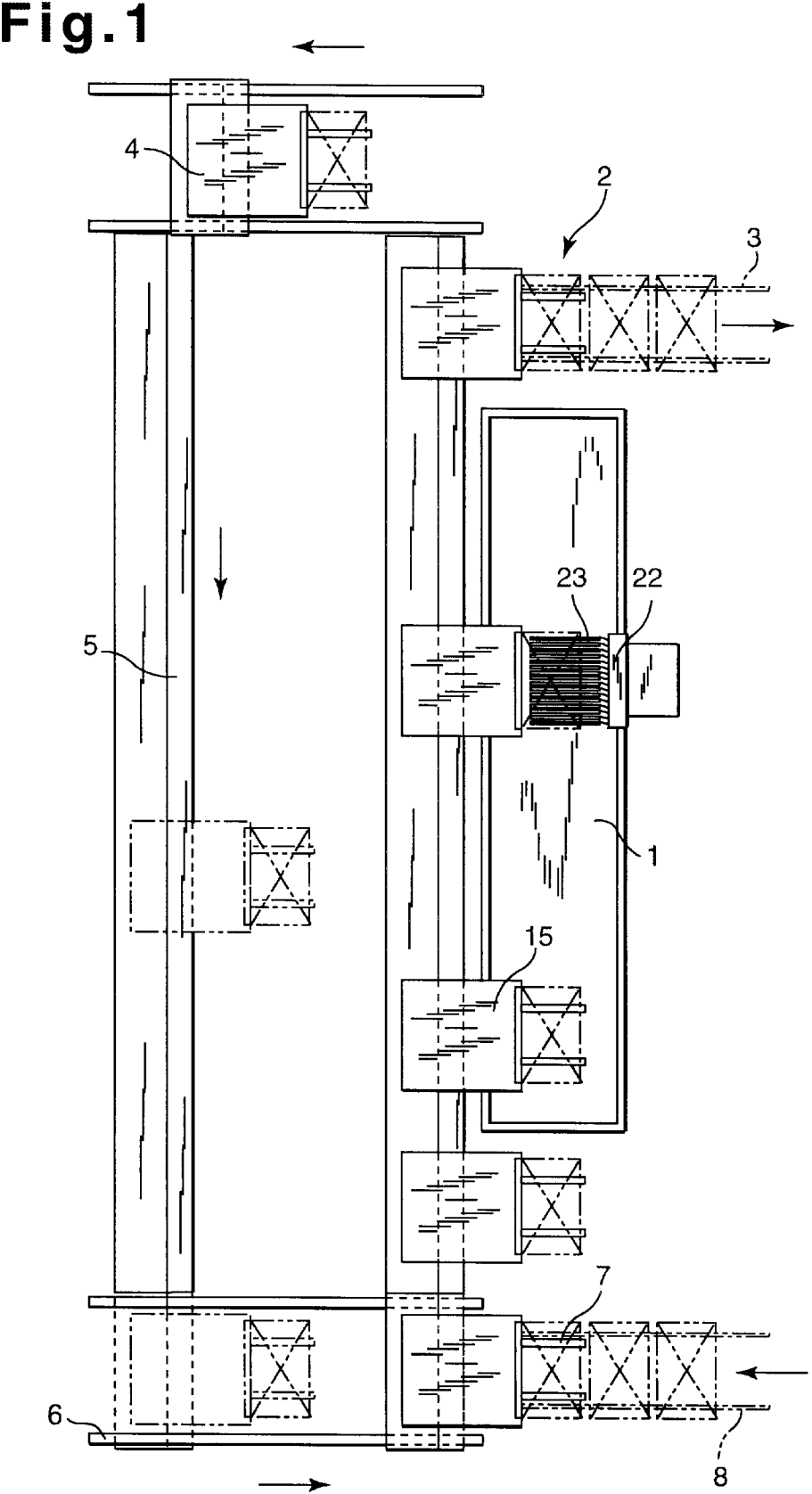
FIG. 1 shows a diagrammatically depicted plan view of a device according to the invention.

The device essentially comprises an immersion vessel 1, an unloading station 2 with a removal conveyor 3 and a transverse conveyor 4, a return path 5, a further transverse conveyor 6 and a loading station 7 with a feed conveyor 8.

The immersion vessel 1 is located in a trough 9 and is equipped with electrodes 10 which are arranged in stationary positions above one another in a plurality of planes. At each of its end sides, the immersion vessel leaves an area 11, 12 clear in order for the material which is to be treated to be introduced and removed.

There may be a spray bath at each of these areas. Next to the immersion vessel 1 or trough 9 there is a rail 13 which extends in the longitudinal direction and on which a plurality of carriages 15, which are each provided with a drive 14 and are designed in the form of a claw in cross section, are guided. Vertically displaceable lifting or stepped cages 16 are guided in the carriages 15. These cages essentially comprise a frame with two U-shaped rails 17 in which driven rollers 18 which are mounted on the carriage 15 engage. Horizontal bearing arms 19 for trays 20 are connected to the rails 17.

The support for the trays 20 comprises individual bars or lamellae 21, for example with a sawtooth profile, as described in detail in German Laid-Open Specification 44 28 789.

Figure 2:
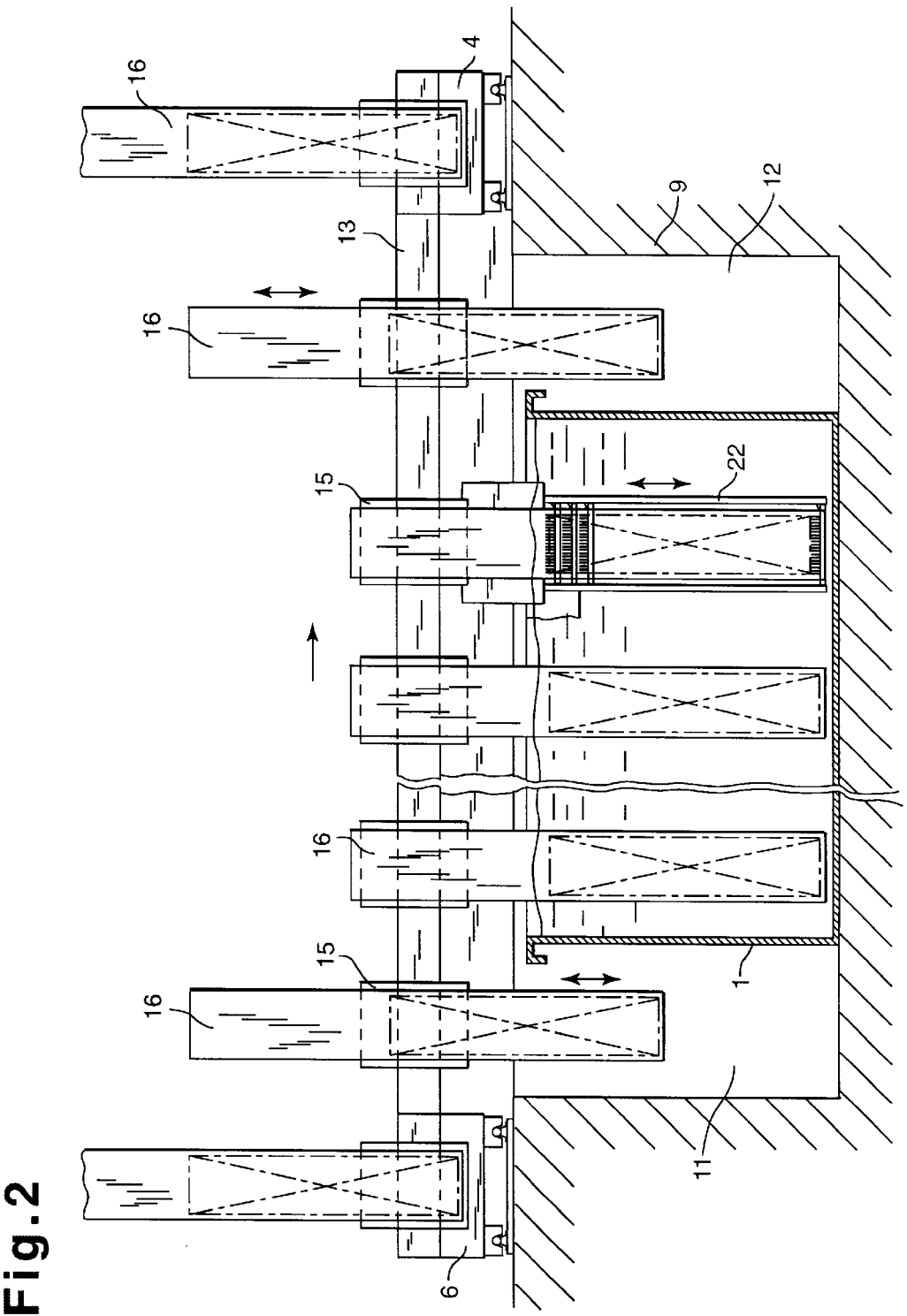
FIG. 2 shows a vertical longitudinal section through an immersion vessel from FIG. 1.
Figure 3:
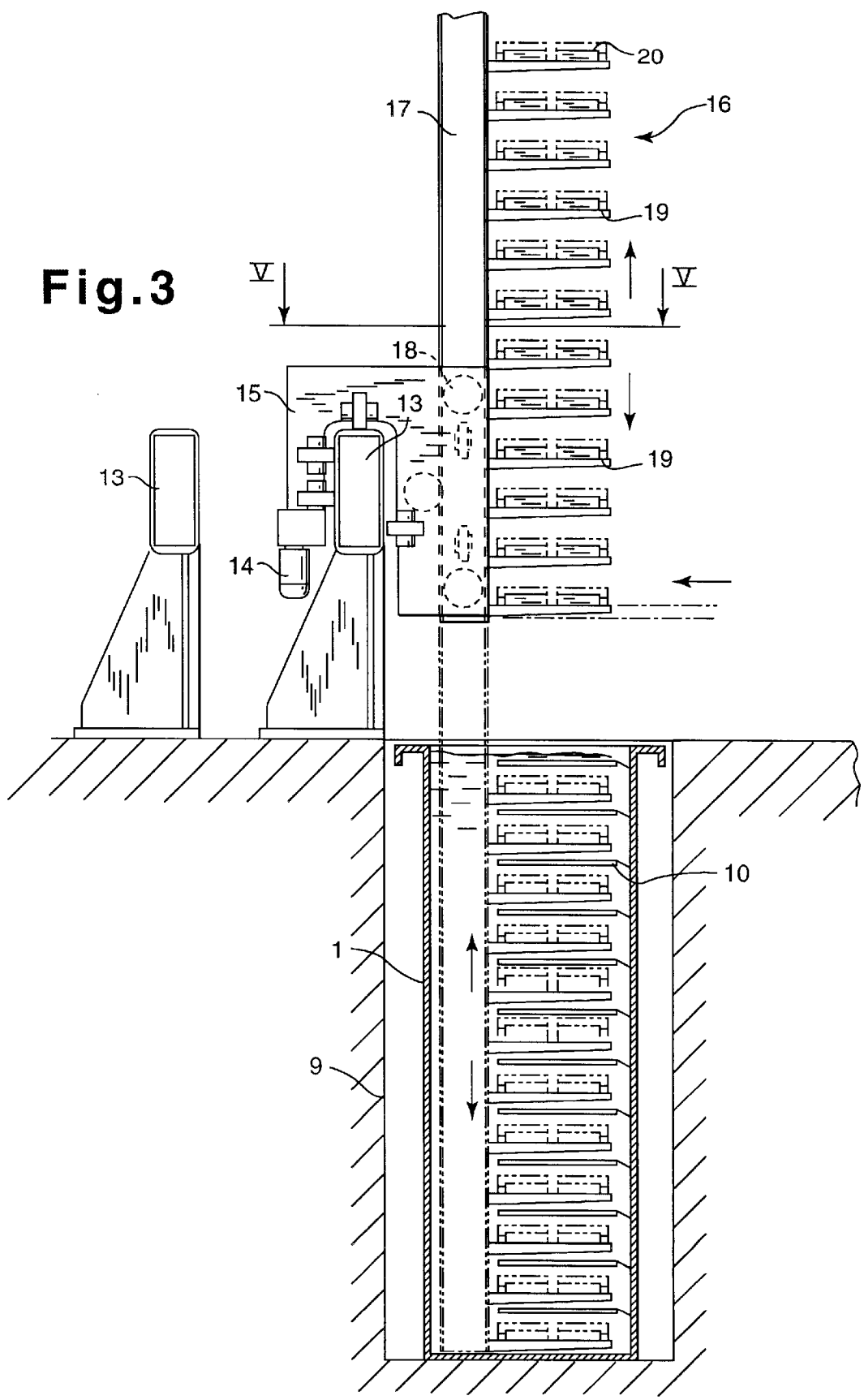
FIG. 3 shows a cross-sectional view of FIG. 2.
Figure 4:
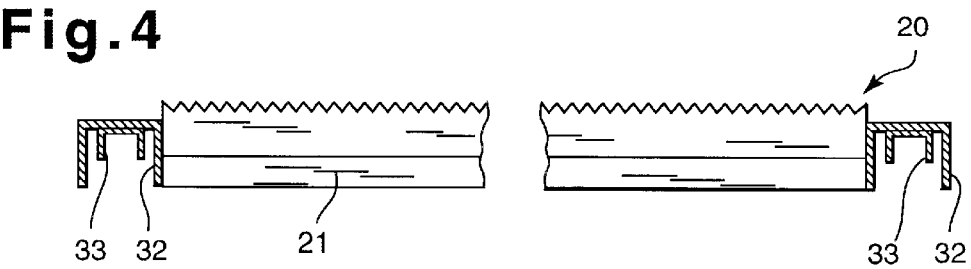
FIG. 4 shows a tray for transporting the material which is to be treated.
Figure 11:
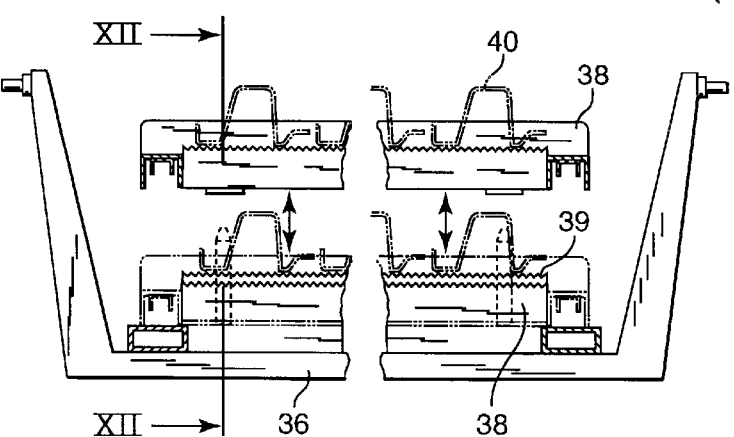
FIG. 11 shows a boat with two trays.
Figure 12:
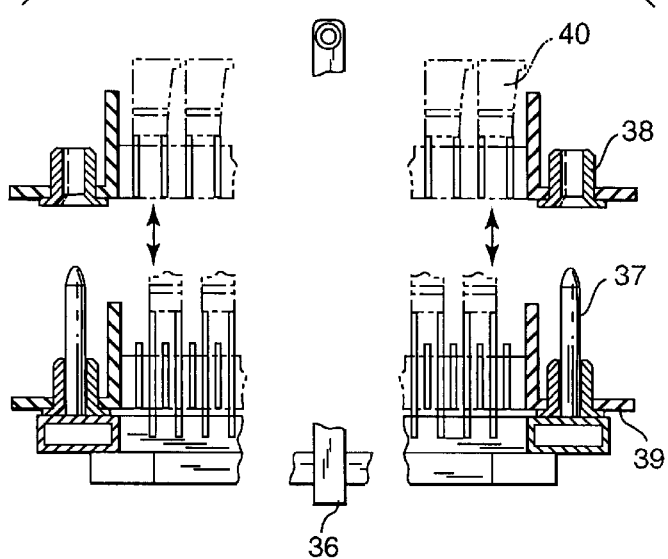
FIG. 12 shows a section on line XII—XII in FIG. 11.
Figure 5:
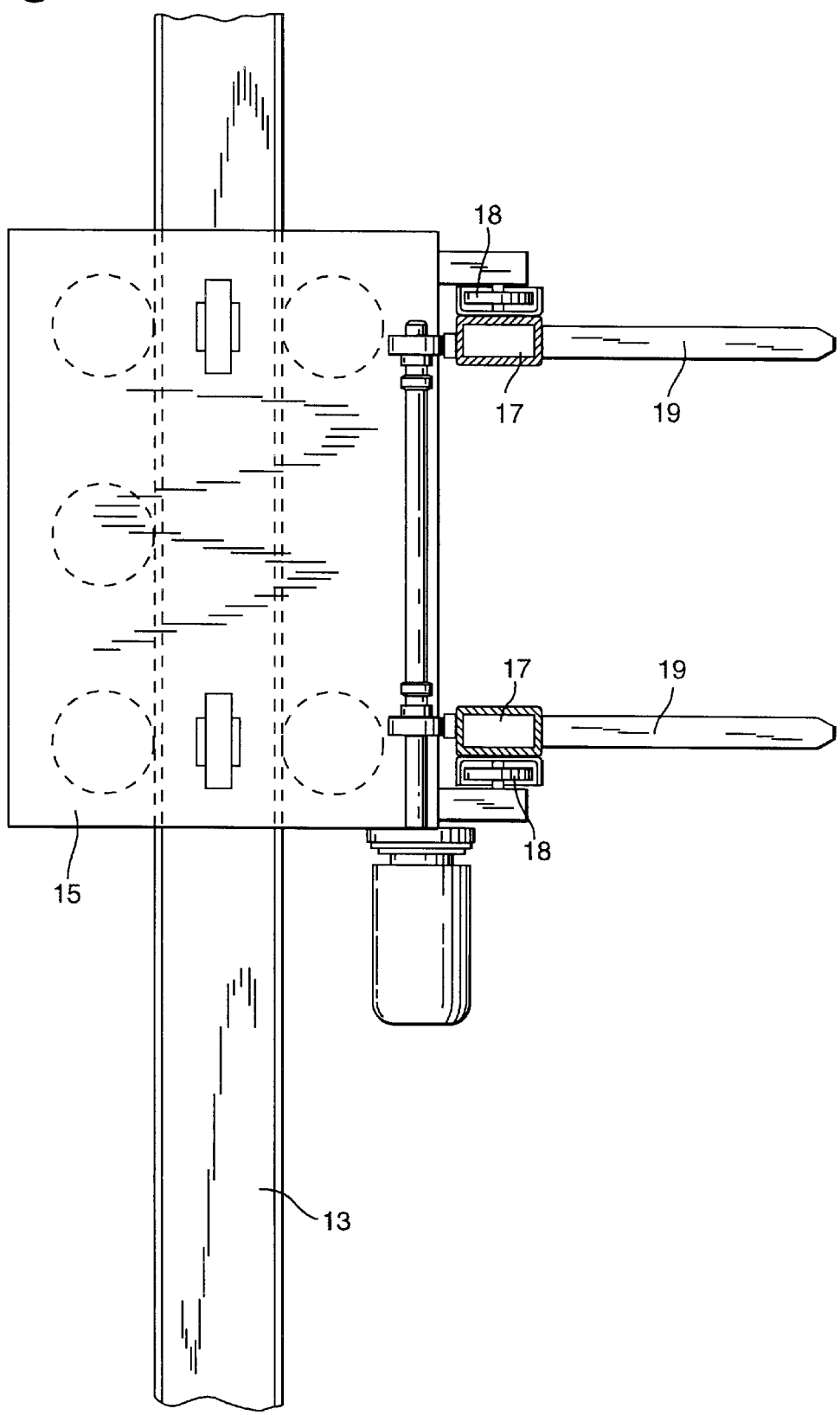
FIG. 5 shows a section on line IV—IV in FIG. 3.
Figure 6:
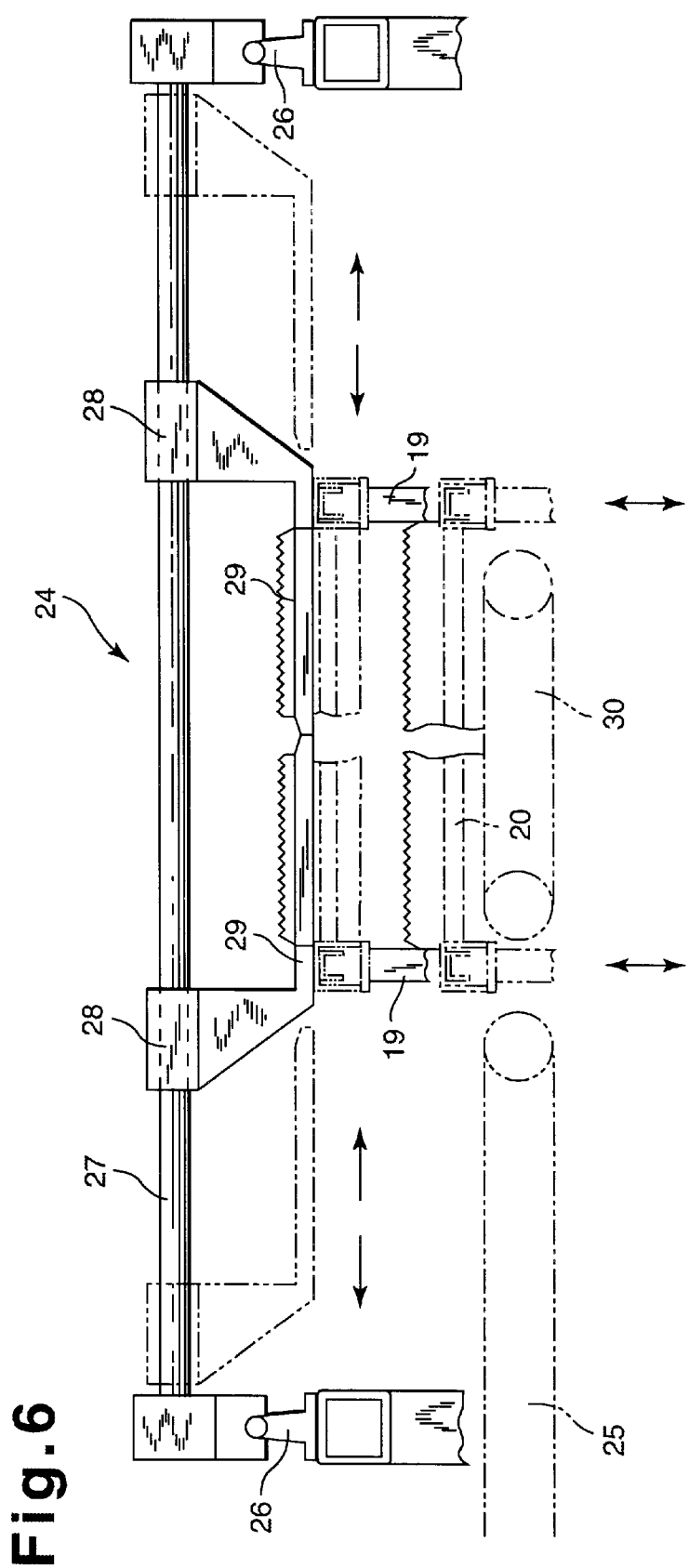
FIG. 6 shows a side view of a transfer station with a conveyor and a gripper.
Figure 7:
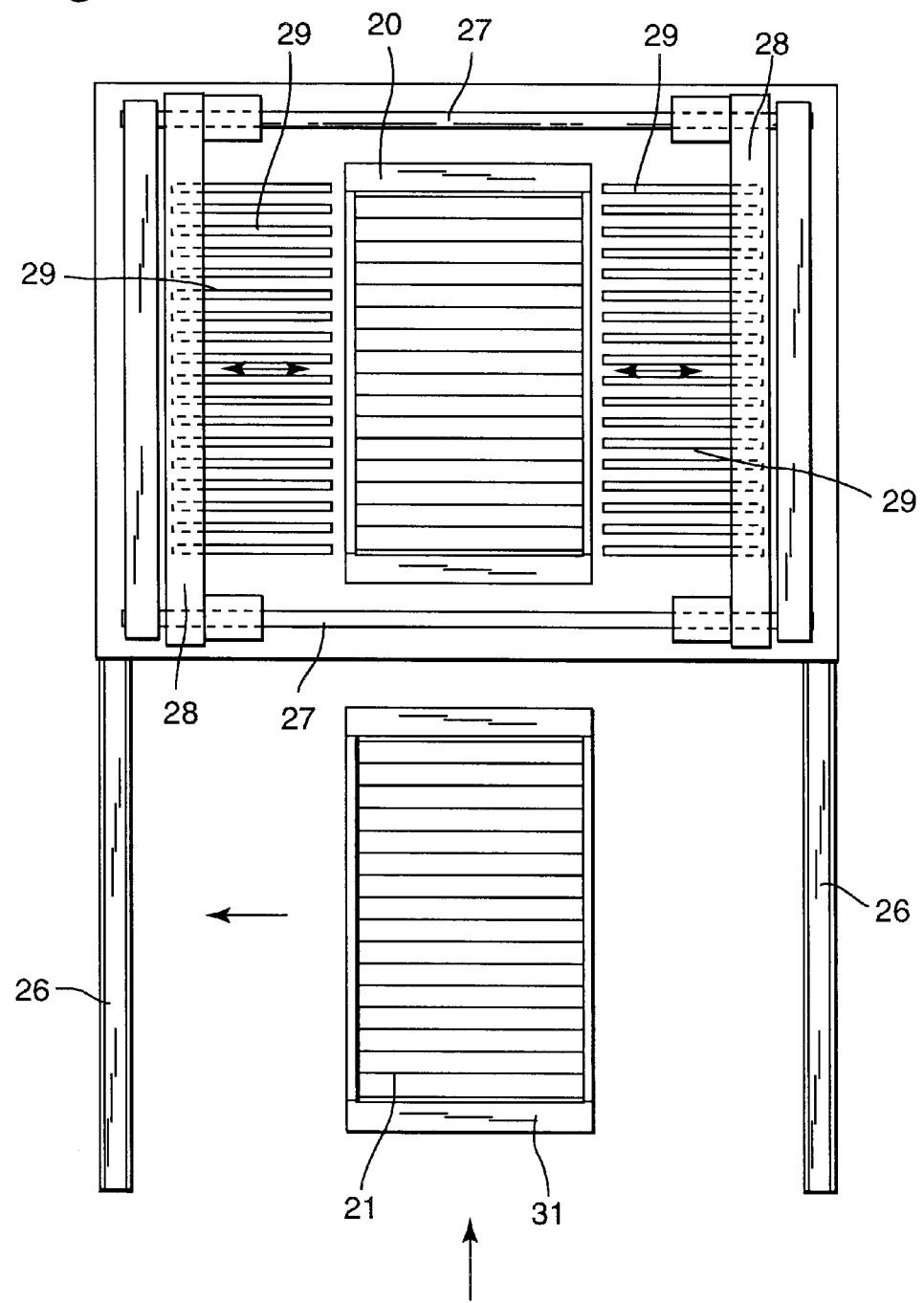
FIG. 7 shows a plan view of the gripper from FIG. 6.
Figure 8:
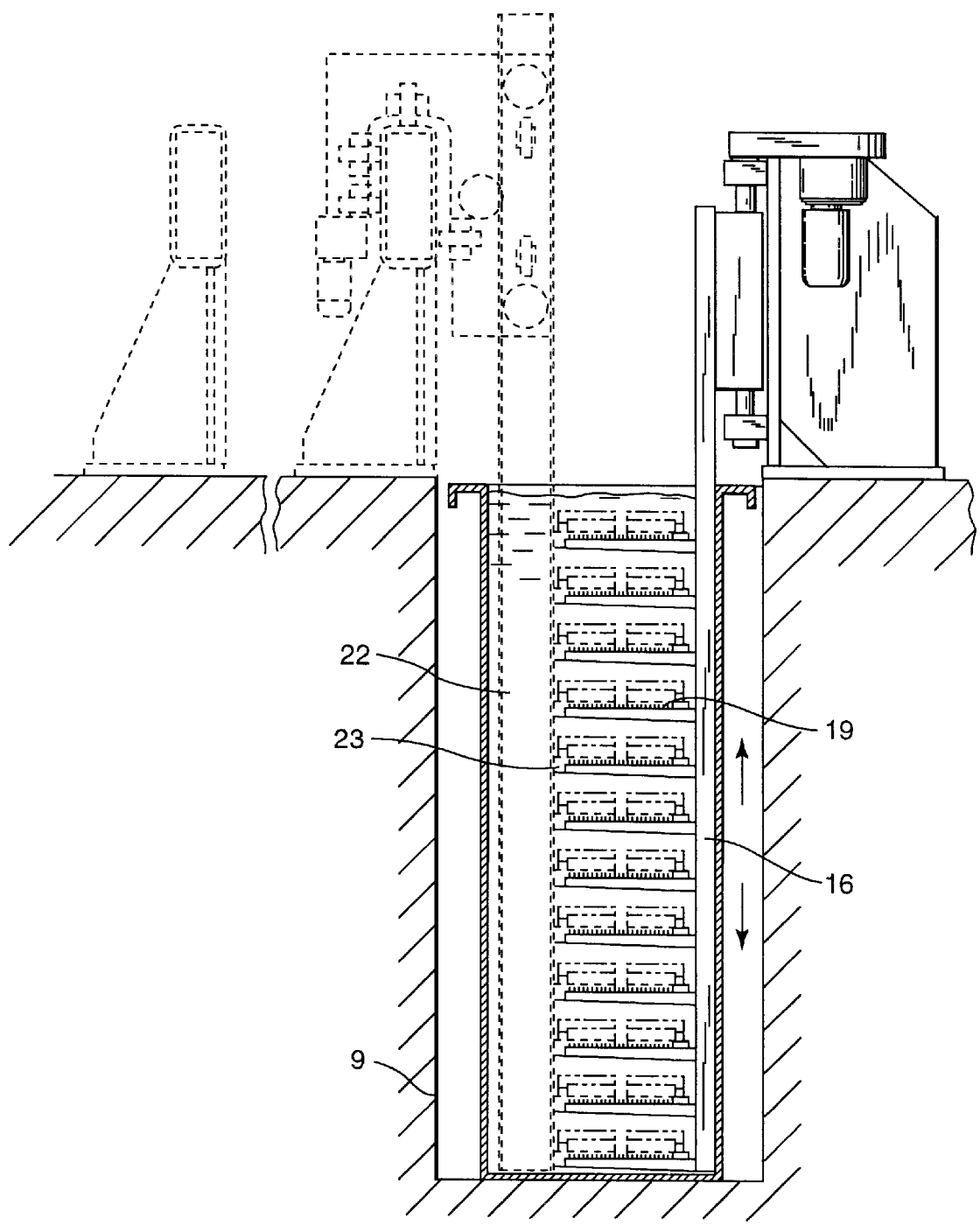
FIG. 8 shows a side view of a transfer station.
Figure 9:
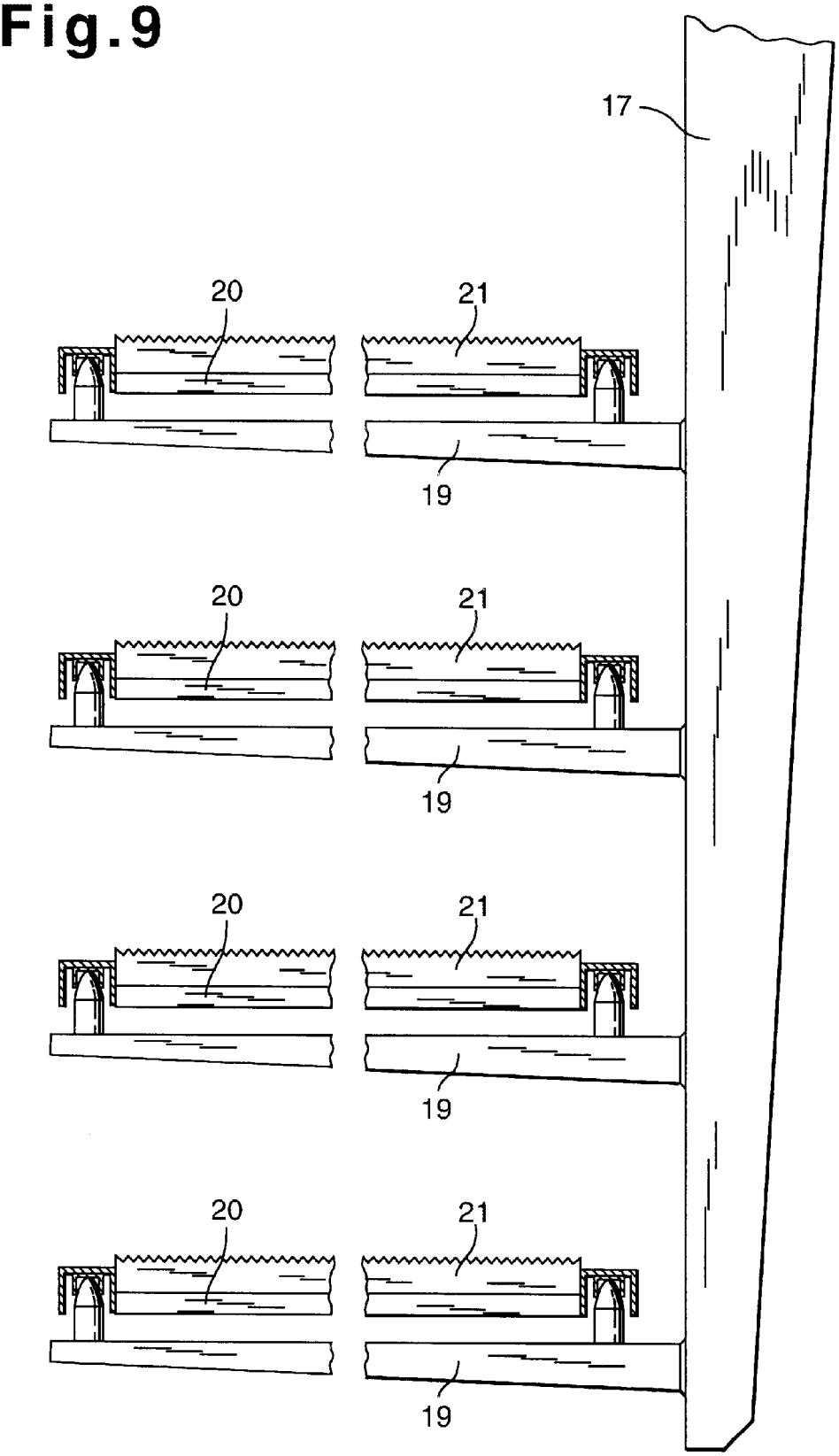
FIG. 9 shows a tray which is connected as an electrode.
Figure 10:
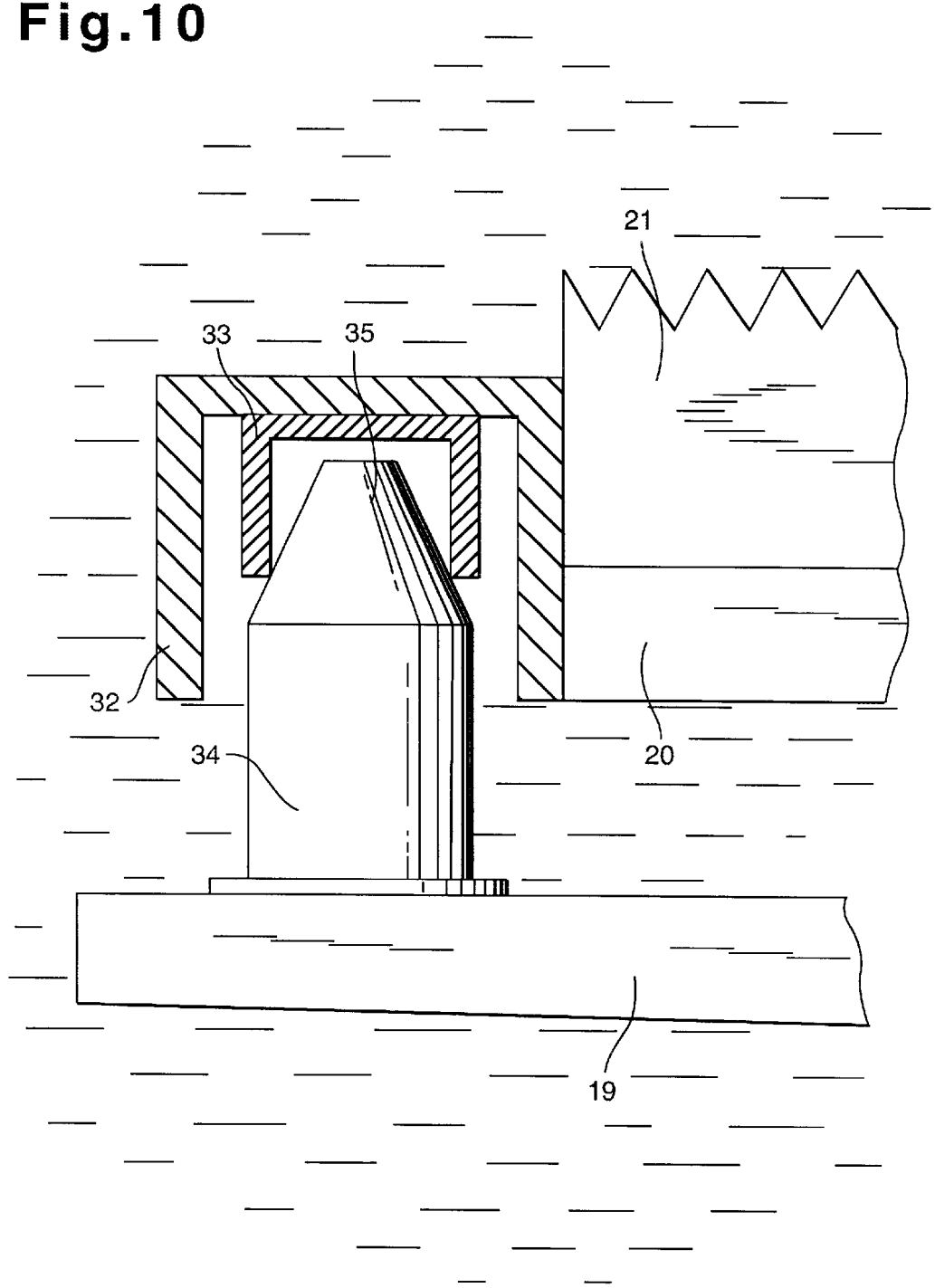
FIG. 10 shows an enlarged view of a tray contact point.

FIG. 2 shows a simplified cross-sectional view, from the left-hand side in FIG. 1, through the first lifting or stepped cage 16, which has not yet been lowered, and the third lifting or stepped cage 16, which has been fully lowered, in the immersion vessel 1.

In the immersion vessel 1 there is a rearrangement cage 22 with protruding fingers 23 which are arranged in the form of a comb and are arranged in the same distribution as the bars or lamellae 21 of the trays 20 in the stepped cage 16. These fingers enable the material which is to be treated and is resting on the bars or lamellae 21 of the trays 20 to be lifted and rearranged when the bars 21 of the trays 20, on the one hand, and the fingers 23 of the rearrangement cage 22, on the other hand, are arranged opposite to and offset from one another.

When the lifting carriage 17 or the bearing arms 19 is/are lowered, the fingers, which are arranged in a stationary position, engage beneath the material which is to be treated and is located on the trays 20, so that the trays, with the aid of the stepped cage 16, can be displaced a small distance to the side without the material which is to be treated. When the lifting cage is then raised again, and in the process, the bearing arms 19 or the trays 20 move back into their previous positions, the material to be treated is again positioned on the trays, but with different points of contact with the sawtooth lamellae.

During loading of the stepped cages 16, the trays 20 which have been supplied by the conveyor 8 are gradually placed onto the bearing arms 19, while the stepped cage 16 moves upwards in a stepwise manner into the feed area. In the process, the bearing arms each move beneath a tray which is located on the conveyor and, during the next movement step, lift this tray off the conveyor, while the conveyor moves forward by the width of one pallet, moving the next tray into the transfer position. As soon as all the bearing arms 19 are covered by trays, the carriage 15 moves the stepped cage 16 to above the immersion vessel. After the stepped cage has been lowered, resulting in immersion, the carriage 15 moves the stepped cage 16 past the electrodes 10 into the transfer station, where the stepped cage resides for the time required to lift the material to be treated with the aid of the fingers 23 of the lifting cage 22. As soon as this has taken place, the carriage 15 moves the stepped cage 16 a small distance, which is shorter than the distance between two tray bars 21, after which the lifting cage 22 lowers the fingers 23 again and, in the process, the fingers deposit the material to be treated back onto the bars of the trays. The relative movement between the material to be treated which is resting on the fingers 23 and the pallet thus results in new points of contact, so that the previous points of contact become accessible to the immersion bath.

After the transfer, the carriage 15 moves the stepped cage 16, in the lowered position, further past the electrodes 10 to the other end of the immersion vessel 1 or, after the cage has been moved upward, to above the removal area 12, where the stepped cage 16 moves downward, in a stepwise manner, over the distance of the bearing arms 19, during which movement the trays 20 are deposited on the removal conveyor 3 while the bearing arms 19 are lowered into the conveyor 3.

A removal gripper 24 moves the material which is to be treated onto other trays for the next treatment stage, which may be a rinsing station, downstream of which there are, for example, a chromating stage and a station for electrophoretic coating with soluble or insoluble anodes. These stations differ from the stations illustrated in FIGS. 1 to 7 for electroplating essentially only in that a material for anodic or cathodic coating is located in the respective immersion vessel.

However, the coating station may also comprise a device as described in German Laid-Open Specification 44 28 789, the disclosure of which is to be regarded as a part of this description. Since this device also operates with trays or pallets, the material to be treated only has to be transferred onto these trays or pallets, so that no labor is required at the transition from one method step to the next method step.

A gripper 24 which is arranged between a horizontal tray conveyor 25 and the loading station of the next immersion vessel is used for transfer purposes. The gripper 24 has a drive (not shown) and can be moved on rails 26 between the conveyor 25 and the immersion vessel, in the longitudinal direction of the conveyor; it is provided with two driven spindles 27, on which bridges 28, which are positioned opposite one another, with bearing arms 29 are arranged. When the spindles 27 are rotated, the bridges 28 move toward one another and engage beneath the material which is to be treated on the particular tray 20 which is located on a lifting table 30 which is arranged as an extension of the conveyor 25. When the lifting table is lowered, the bearing arms take the material to be treated off the tray 20. By means of lateral displacement of the longitudinal carriage 28, the material to be treated is moved over a tray 31 for the next treatment step, which tray is likewise located on a lifting table which is integrated into a conveyor. As the lifting table is raised, the tray 31 takes the material to be treated off the bearing arms 29 of the gripper 24. When the gripper is opened and the lifting table is then lowered, a tray moves onto the conveyor, from where it is transferred, in the manner described in connection with FIG. 1, into a stepped cage of the next immersion vessel or into a suspension rail according to German Laid-Open Specification 44 28 789. The tray then takes over those bearing arms of the stepped cage (which is located on the feed side of the immersion vessel) which are positioned slightly below the plane of movement of the tray. When the stepped cage is moved a small distance upward, the bearing arms in question take the tray 20 off the conveyor which comes from the gripper.

In order to be able to connect the trays 20 as electrodes, they are equipped with at least one contact chamber 32. The contact chambers 32 are open at the bottom and contain contact sleeves 33 which are also open at the bottom and in which contact pins 34 on the bearing arms 19 of the stepped cages 16 engage. The contact pins have a conical point 35 which creates a linear contact with the inner edge of the contact sleeve. In this way, the tray 20 is connected as an electrode to the material which is to be treated and is resting on the tips of the lamellae 21. Since only small amounts of the solution of coating agent enter the contact chamber, there is no risk of the contact pins and the contact sleeves also being coated and of the electric contact being lost in this way.

The material to be treated may also be guided through the immersion vessel with the aid of a suspension rail as described in German Laid-Open Specification 44 28 789. In this case, a boat 36 which is provided with centering pins 37 and holds two trays 38, 39 is used. These trays are one electroplating tray 38 and one enameling tray 39, which fit accurately inside one another. The electroplating tray 38 is insulated from the boat 36 and is therefore not at risk of being coated. Following enameling, the electroplating tray is pulled upward away from the centering pins 37 and the material 40 to be treated is transferred back onto the electroplating tray.

The trays do not have to be equipped with sawtooth lamellae; other bearing elements which ensure that the contact area with the material to be treated is as small as possible are also suitable. Contact which is essentially punctiform is the most advantageous solution.

The method according to the invention is extremely economical primarily because the outlay on labor is extremely low and the throughput is considerably higher than with a method which operates with conventional conveyor devices for the material to be treated, with a single conveying plane. In addition, the surface quality is high due to the ease of access to the material to be treated for the treatment agent.

The invention is suitable in particular for an electrochemical surface treatment, for example for the application of a layer of zinc, zinc/iron or zinc/nickel, which is subsequently chromated, if the chromating is followed by electrophoretic coating. In this way, it is possible to provide surfaces with a metal/enamel coating in an extremely economical manner.

What is claimed is:

1. A device for surface treatment, the device comprising:
an immersion vessel;
a horizontally displaceable carriage;
a vertically displaceable cage provided within the carriage, the cage comprising bearing arms arranged at a vertical distance from one another;
stationary treatment elements that project between the bearing arms of the vertically displaceable cage; and
a conveyor;
wherein the conveyor is arranged and configured to move the carriage and the vertically displaceable cage in a horizontal direction.

2. The device as claimed in claim 1, wherein the vertically displaceable cage comprises a vertically displaceable lifting carriage with the bearing arms connected thereto.

3. The device as claimed in claim 2, wherein the horizontally displaceable carriage guides the lifting carriage.

4. The device as claimed in claim 1, wherein the treatment elements comprise electrodes, and wherein the bearing arms are electrodes.

5. The device as claimed in claim 1, wherein the immersion vessel comprises protruding electrodes that are arranged at a vertical distance from one another.

6. The device as claimed in claim 1, further comprising supports for a material to be treated, the supports comprising trays with bars.

7. The device as claimed in claim 6, wherein the trays are provided with contact chambers that are open at the bottom.

8. The device as claimed in claim 7, further comprising contact pins that engage in the contact chambers.

9. The device as claimed in claim 8, wherein the contact pins are in contact with contact sleeves that are in the contact chambers.

10. The device as claimed in claim 6, further comprising a rearrangement cage with protruding fingers, a distribution of and distance between which fingers corresponds to a distribution of and distance between the bars of all the trays which are arranged in the vertically displaceable cage.

11. A method for surface treatment, the method comprising the steps of:
arranging a material to be treated on a vertically displaceable cage, the cage being within a horizontally displaceable carriage, the cage comprising bearing arms arranged at a vertical distance from one another; and
moving the material horizontally and vertically through a treatment zone comprising fixed treatment elements at a plurality of levels, the treatment elements projecting between the bearing arms of the vertically displaceable cage.

12. The method as claimed in claim 11, further comprising the step of moving the material to be treated through an electrolyte.

13. The method as claimed in claim 12, further comprising the step of electrophoretically coating the material to be treated after moving the material through the electrolyte.

14. The method as claimed in claim 11, further comprising the step of rearranging the material to be treated during its passage through the treatment zone.

15. The method as claimed in claim 11, further comprising the step of rearranging the material to be treated between two passages through the treatment zone.

* * * * *